US006844555B2

(12) United States Patent
Beasley

(10) Patent No.: US 6,844,555 B2
(45) Date of Patent: Jan. 18, 2005

(54) COVERING AND MOUNTING STRUCTURE FOR A MOTION DETECTOR HAVING LIGHT EMITTING DIODES AND ELECTRONIC ADJUSTMENT CONTROLS

(75) Inventor: Daniel John Beasley, Bromsgrove (GB)

(73) Assignee: IQ Group SDN BHD, Fasa 1 (Ftz) Bayan Lepas (MY)

( * ) Notice: Subject to any disclaimer, the term of this patent is extended or adjusted under 35 U.S.C. 154(b) by 124 days.

(21) Appl. No.: 10/166,438

(22) Filed: Jun. 10, 2002

(65) Prior Publication Data

US 2003/0227391 A1 Dec. 11, 2003

(51) Int. Cl.[7] ............................ G01J 5/02; G08B 13/19

(52) U.S. Cl. ................... 250/342; 250/353; 250/DIG. 1

(58) Field of Search ........................... 250/DIG. 1, 342, 250/353

(56) References Cited

U.S. PATENT DOCUMENTS 5,513,085 A * 4/1996 Bourne ........................ 362/286
5,604,483 A * 2/1997 Giangardella et al. ....... 340/565
6,075,440 A * 6/2000 Carroll ........................ 340/546

* cited by examiner

*Primary Examiner*—Constantine Hannaher
(74) *Attorney, Agent, or Firm*—Mintz Levin Cohn Ferris Glovsky & Popeo, PC

(57) ABSTRACT

A covering and mounting structure for mounting a motion detector having electronic adjustment controls, light emitting diodes (LEDs), and at least one motion detector lens, provides for selectively covering the controls, LEDs and a motion detector lens. The structure can be cylindrical or non-cylindrical in shape, and disposed in pendant or standing-post arrangement. Furthermore, the structure includes a telescopic structure or an exterior cover for the selective covering. In one embodiment, the structure includes one downwardly viewing first motion detector lens and a laterally viewing second PIR motion detector lens.

8 Claims, 12 Drawing Sheets

COVERING AND MOUNTING STRUCTURE FOR A MOTION DETECTOR HAVING LIGHT EMITTING DIODES AND ELECTRONIC ADJUSTMENT CONTROLS

TECHNICAL FIELD

The invention relates generally to a covering and mounting structure for a motion detector having light emitting diodes (LEDs) and electronic adjustment controls. It relates, in particular, to two motion detector lenses mounted on the covering and mounting structure disposed in pendant arrangement such that the covering and mounting structure allows selective concealment of the LEDs, electronic adjustment controls and motion detector lenses.

BACKGROUND OF THE INVENTION

A motion sensor is typically mounted on a wall, eave, ceiling or post location. The sensor includes electronic adjustment controls with variable settings to adjust the electronic and/or optical performance of the product. Also included on the sensor are light emitting diode (LED) indicators, which indicate the electronic status of the product. Additionally, physical masking of a passive infra-red (PIR) lens on the sensor is included. The masking limits the detection area covered by the sensor. Furthermore, detection directional control is commonly achieved by aiming the sensor in the appropriate general direction. Such directional adjustment has been achieved via mechanical joints.

The motion detector may be electrically connected to devices such as security, lighting, audio alarms, and the like. These devices can be bodily incorporated with the motion detector or the motion detector may be a separate stand-alone unit.

Prior art combined motion detector and security lighting devices typically comprise a mounting plate equipped with at least a motion detector and at least one security light. U.S. Pat. No. Des. 424,727 discloses an ornamental design for a combined motion detector and security lighting device. Two spotlights are disposed above a motion detector.

Prior art devices include electronic adjustment controls which allow variable settings to adjust the electronic or optical performance of the device. These electronic adjustment controls are often covered to enhance the appearance of the device and to avoid exposure to environmental influences. These covers conventionally are separate plastic pieces which can easily drop off, get damaged or lost during installation, or during subsequent operation.

The device can further include LED indicators which indicate the electronic status of the device. When light emitting diodes (LEDs) are employed, they are commonly on permanent display. However in certain applications, it is preferable to conceal them from sight.

A PIR motion detector lens is employed to focus infra-red energy onto an internal sensor mechanism. Physical masking of the motion detector lens is often required to limit or regulate the detection area by partially covering the lens. Invariably this is achieved via the use of plastic parts. Whilst this solution may work, the masking material can easily be dropped, damaged or lost. In many cases, the replacement process is time consuming and sometimes a difficult assembly method is involved.

Directional control of detection commonly requires existing sensors to be angled downward toward likely direction of motion activation. This results in a compromise of the detection efficiency, as the detection pattern lifts from the ground at the outer fringes (left and right) of the detection area.

An objective of the present invention is to provide a robust, integrated and easy-to-use covering and mounting structure whereby the electronic adjustment controls, LED display, and motion detector lens, or part thereof, can be concealed selectively.

Another objective of the invention is to provide a covering and mounting structure with enhanced detection capability.

Yet, another objective of the invention is to provide a covering and mounting structure of an integrated aesthetic appearance, when compared with conventional design configurations.

SUMMARY OF THE INVENTION

Accordingly, the invention provides certain improvement features to a prior art motion detector, particularly its covering and mounting structure.

The fundamental improvement feature is to adopt a telescopic design for the covering and mounting structure, where no separate covering is required.

One improvement feature is to incorporate two motion detector lenses on a covering and mounting structure disposed in pendant arrangement, where one lens is downwardly viewing and the other lens is laterally viewing.

Another improvement feature is to allow the motion detector lenses to be utilised in a pendant arrangement, whereby the sensor body is always able to hang vertically down from ceiling or wall installations.

Yet, another improvement feature is to incorporate one motion detector lens on a covering and mounting structure in a standing post arrangement, where the lens is laterally viewing.

Still another improvement is that the product features can be selectively concealed by a covering structure when the telescopic design is not employed.

According to the teaching of the invention, the covering and mounting structure can either be of telescopic or single body design. Furthermore, the covering and mounting structure can be disposed in pendant or standing post arrangement. In pendant arrangement, two motion detector lenses are employed, one is downwardly viewing and the other laterally viewing.

Particularly in the case of a telescopic design disposed in pendant arrangement, the covering and mounting structure further comprises an inner tube or channel, an outer tube or channel and an intermediate tube or channel. The inner tube or channel carries a downwardly viewing first motion detector lens, and a laterally viewing second PIR motion detector lens above the first motion detector lens. The inner tube or channel also carries LEDs and electronic adjustment controls. The outer tube or channel serves to receive said intermediate and inner tubes or channels.

In the case of a telescopic design disposed in standing post arrangement, only one laterally viewing second PIR motion detector lens is provided on the covering and mounting structure.

Next, in the case of a single body design disposed in pendant arrangement, an exterior covering structure is employed to selectively conceal the product features. The shape of exterior covering structure must match and fit the shape of the mounting structure, and can be of circular, or non-circular shapes.

BRIEF DESCRIPTION OF THE DRAWINGS

The invention will be described further, by way of three embodiments, with reference to the following drawings, in which.

DETAILED DESCRIPTION

Figure 8:
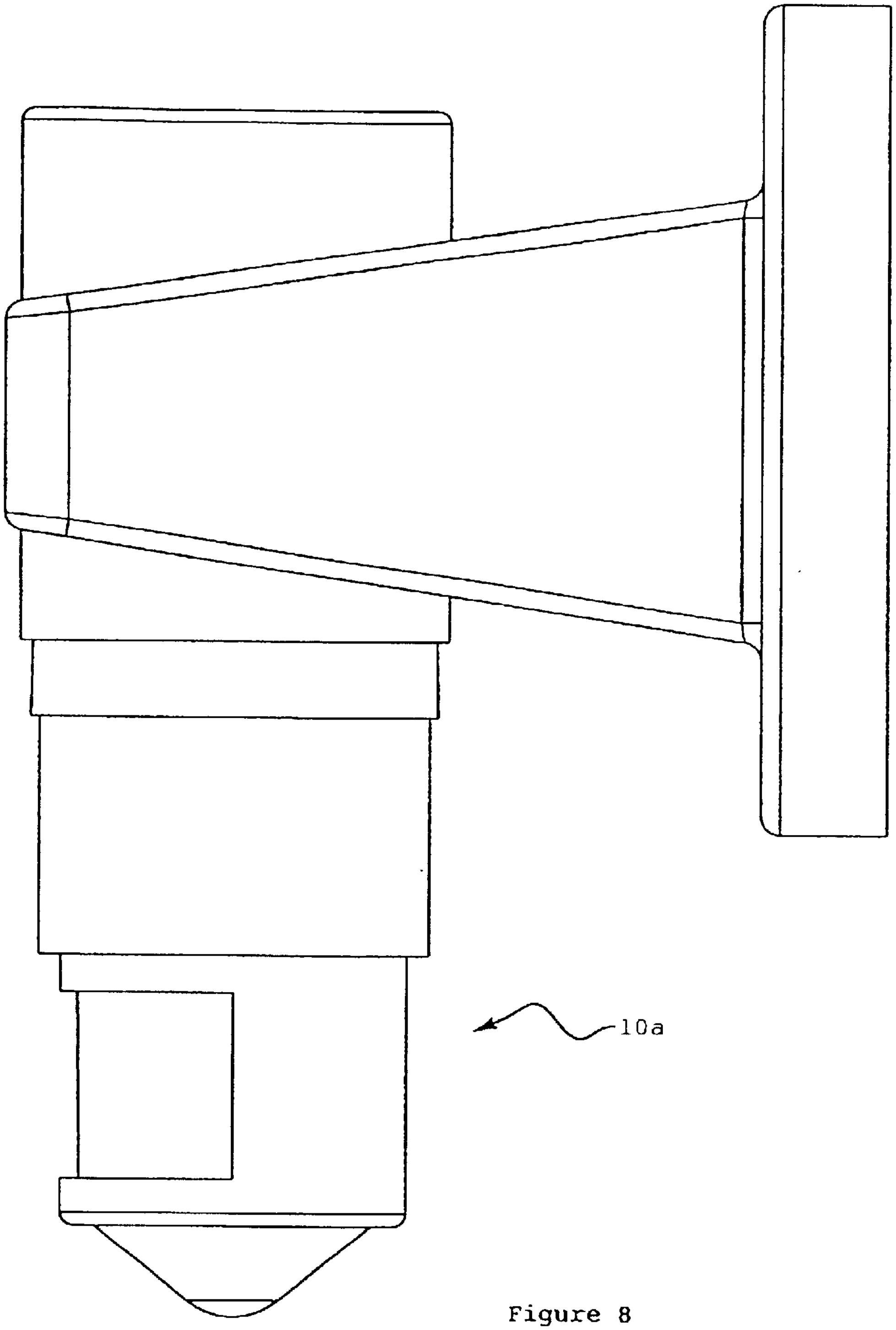
FIG. 8 shows a side view of the first embodiment shown in FIG. 1 being wall-mounted in a pendant arrangement.
Figure 9:
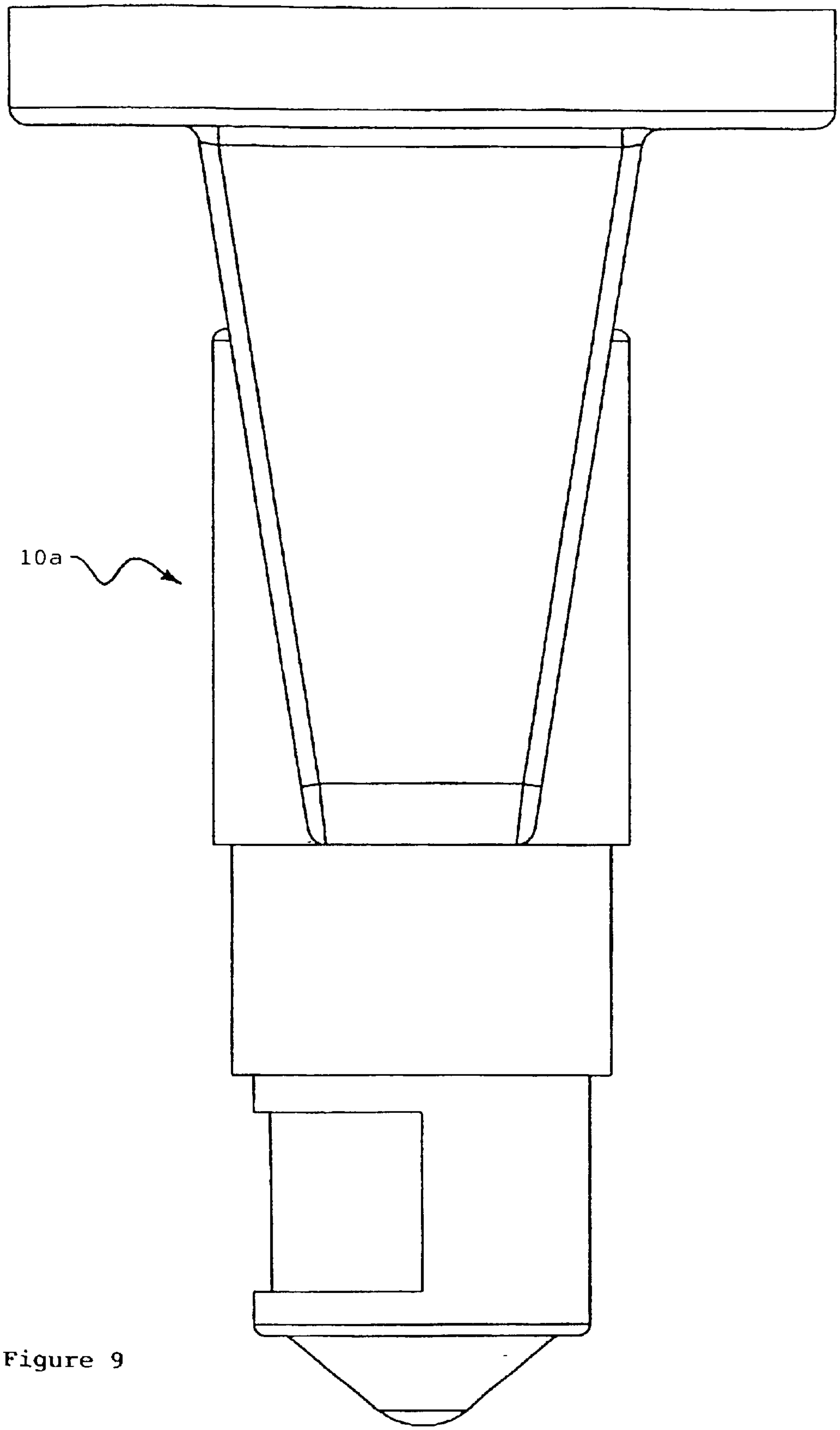
FIG. 9 shows a side view of the first embodiment shown in FIG. 1 being ceiling-mounted in a pendant arrangement.

For clarity, alphabets "a", "b" and "c" are used to differentiate the three embodiments. For the sake of explanation, a first embodiment of the invention is elaborated in the form of a cylindrical telescopic covering and mounting structure 10*a* disposed in a pendant arrangement. The covering and mounting structure 10*a* is either wall-mounted or ceiling-mounted as shown in FIGS. 8 and 9, respectively.

Figure 1:
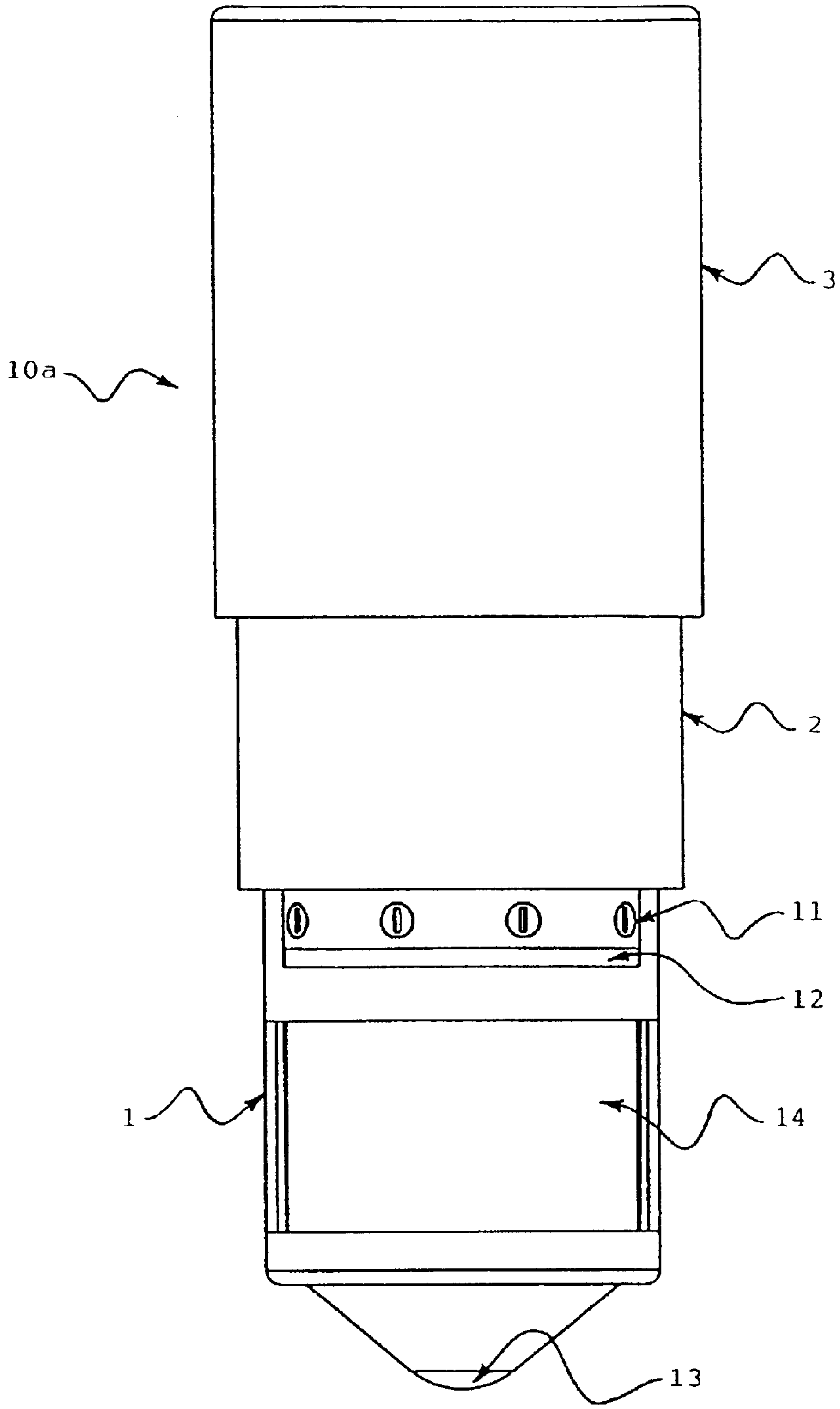
FIG. 1 shows a front view of a first preferred embodiment of the invention, depicting a telescopic cylindrical covering and mounting structure in pendant arrangement, with electronic adjustment controls, LEDs, a second PIR motion detector lens and a first motion detector lens, in a fully extended position.
Figure 2B:
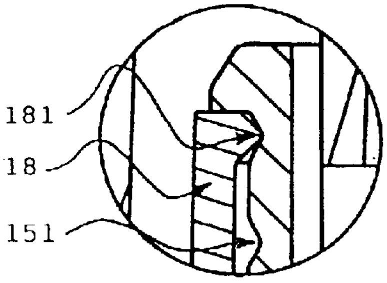
FIG. 2*b* shows an enlarged view of the area marked "A" in FIG. 2*a*.
Figure 2A:
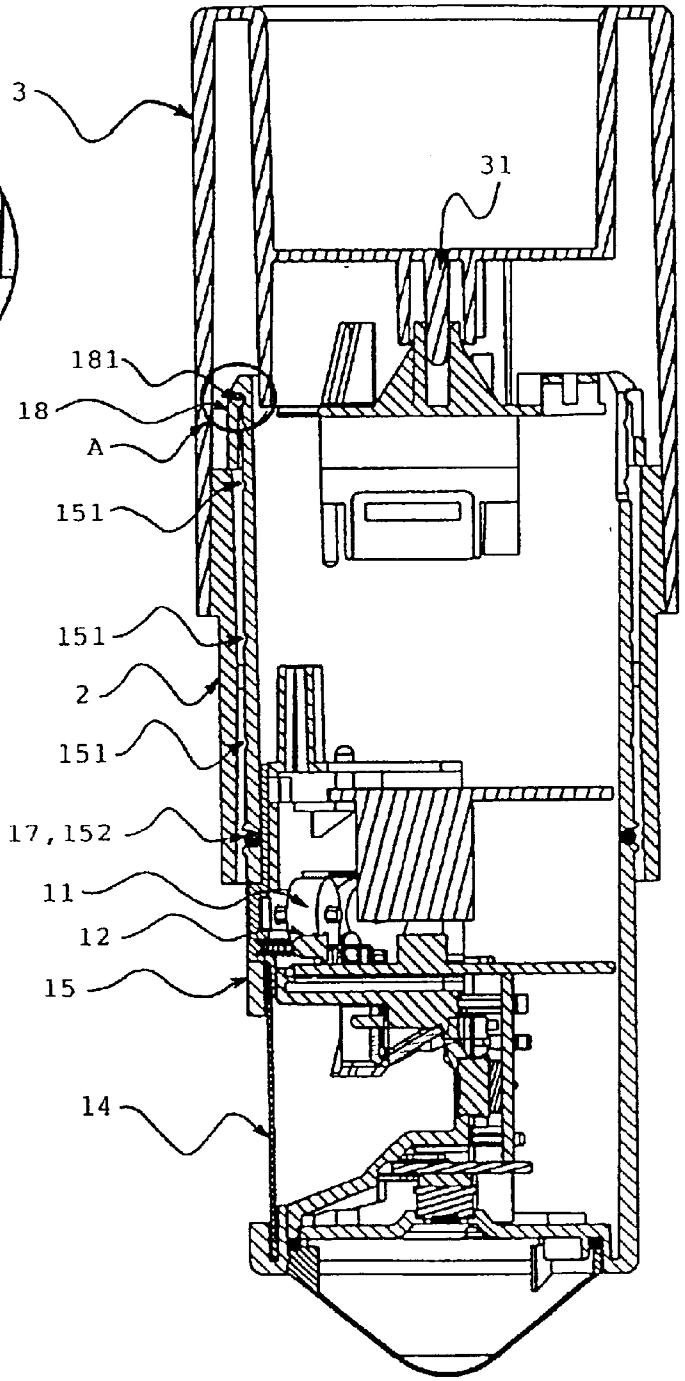
FIG. 2*a* shows a cross-section view of the embodiment as shown in FIG. 1.

Referring first to FIGS. 1 and 2*a*, a cylindrical telescopic covering and mounting structure 10*a* is shown in its fully extended position. Electronic adjustment controls 11, LEDs 12, a second PIR motion detector lens 14 and a first motion detector lens 13 are carried on the covering and mounting structure 10*a*. The first motion detector lens 13 is downwardly viewing and provides a limited motion detection. The second PIR motion detector lens 14 is laterally viewing and provides wider motion detection.

The covering and mounting structure 10*a* comprises an inner tube 1 an intermediate tube 2 and an outer tube 3, and the three tubes 1, 2, 3 are telescopically assembled. The inner tube 1 carries the downwardly viewing first motion detector lens 13, and the laterally viewing second PIR motion detector lens 14 above the first motion detector lens 13. The inner tube 1 also carries the LEDs 12 and the electronic adjustment controls 11, with the electronic adjustment controls 11 placed above the LEDs 12. The outer tube 3 and the intermediate tube 2 serve to receive the inner tube 1.

A sensor bottom cover 15, to which the electronic adjustment controls 11, the LEDs 12 and the second PIR motion detector lens 14 are bodily connected, is allowed to move up and down, but limited by the position of the intermediate tube 2 and the outer tube 3. These tubes 1, 2, 3 are attached together, with the assistance of mechanical structures such as clips, to create an enclosure in which the inner tube 1 is able to move. The intermediate and outer tubes 2, 3 are also the interface tubes, whereby these designs are adapted to provide the mechanical interface with the device to which the sensor is being applied.

Figure 6:
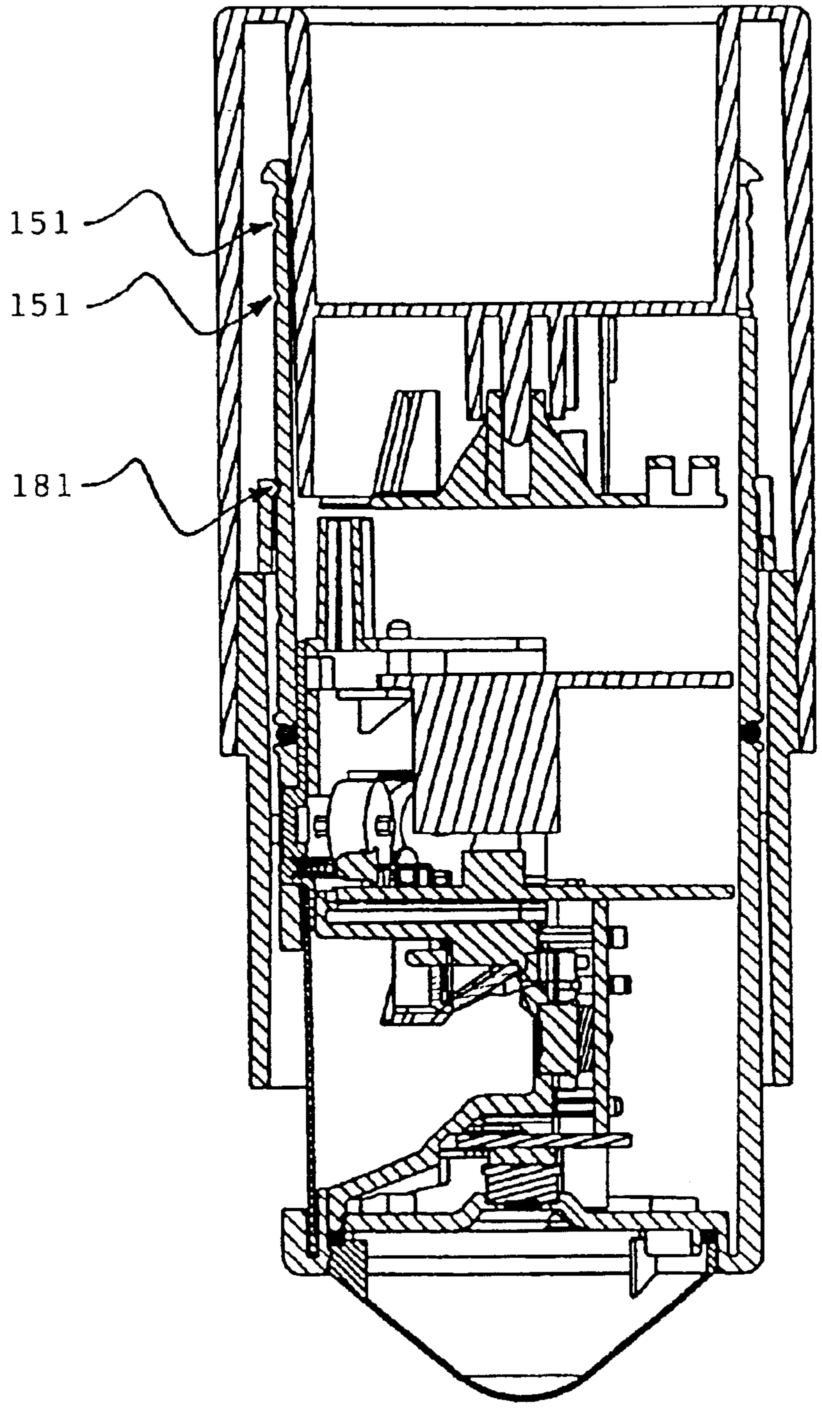
FIG. 6 shows a cross-section view of the embodiment as shown in FIG. 5.

Now referring to FIGS. 2*a*, 2*b* and 6, a sensor top cover 18 is jammed or secured with a suitable mechanical connector between the intermediate and inner tubes 2, 1. A horizontal protrusion 181 is provided around the internal circumference of the sensor top cover 18. A plurality of grooves 151 is provided throughout the length of the inner tube 1 at predetermined intervals on its external circumference. The horizontal protrusion 181 engages appropriate grooves 151 on the up and down movement of the inner tube 1 at each adjustment position.

An O-ring 17, disposed in a pre-determined groove 152 on the sensor bottom cover 15, provides sufficient interface with intermediate tube 2, in order to achieve the necessary seal against water ingression.

In addition to the upward or downward adjustment, a side to side or pan adjustment is also provided by an axial rotation created between the outer tube 3 and the sensor top cover 18. This is achieved by a vertical protrusion 31 inside the outer tube 3 and an interfacing boss on the sensor top cover 18.

The electronic adjustment controls 11, the LEDs 12 and the laterally 20 viewing second PIR motion detector lens 14 are progressively and selectively concealed by adjacent tubes 2, 3, when retracting the inner tube 1 into the intermediate and outer tubes 2, 3.

Figure 3:
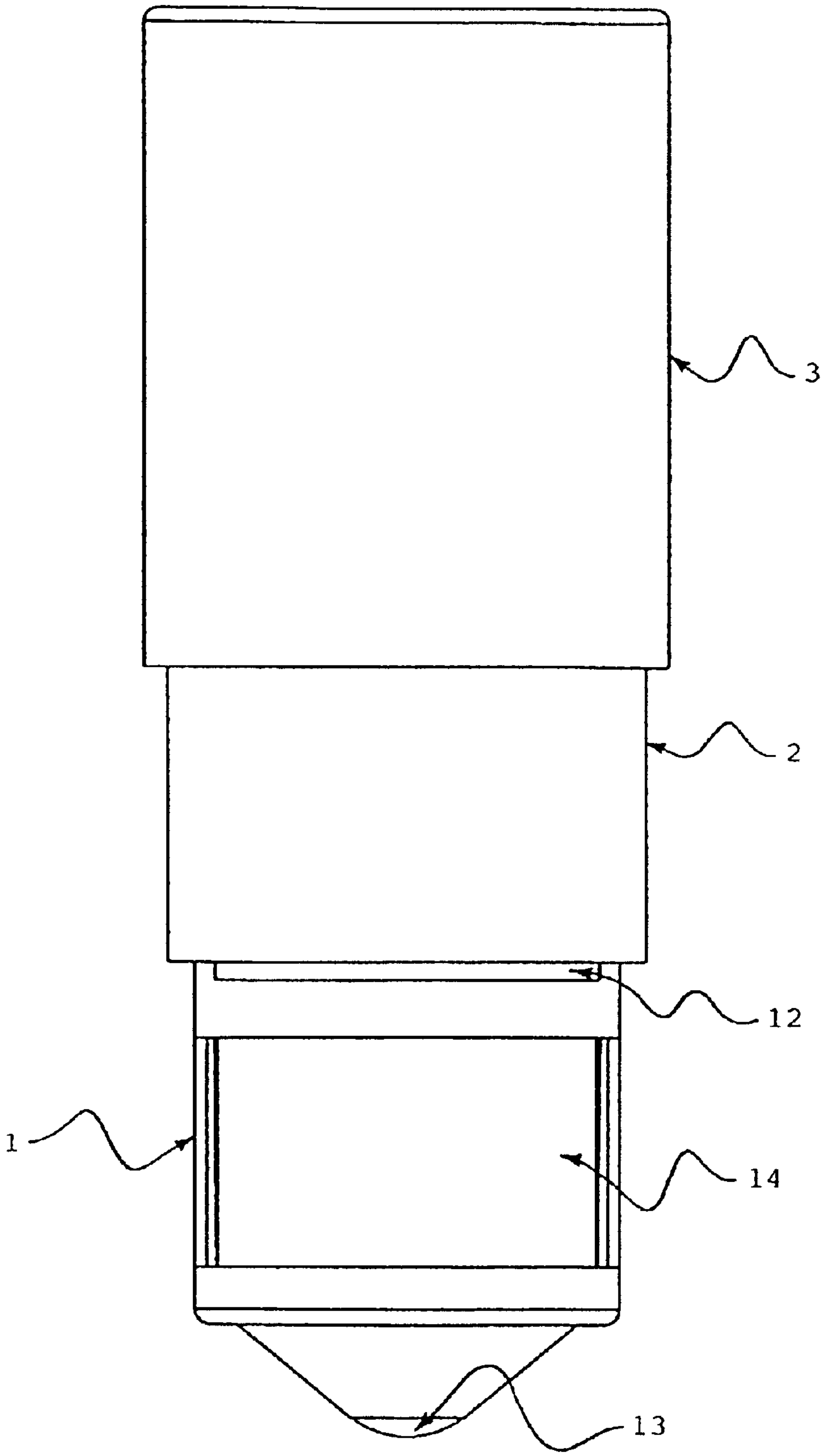
FIG. 3 shows a front view of the embodiment as shown in FIG. 1, with the LEDs and the second PIR motion detector lens fully visible.
Figure 4:
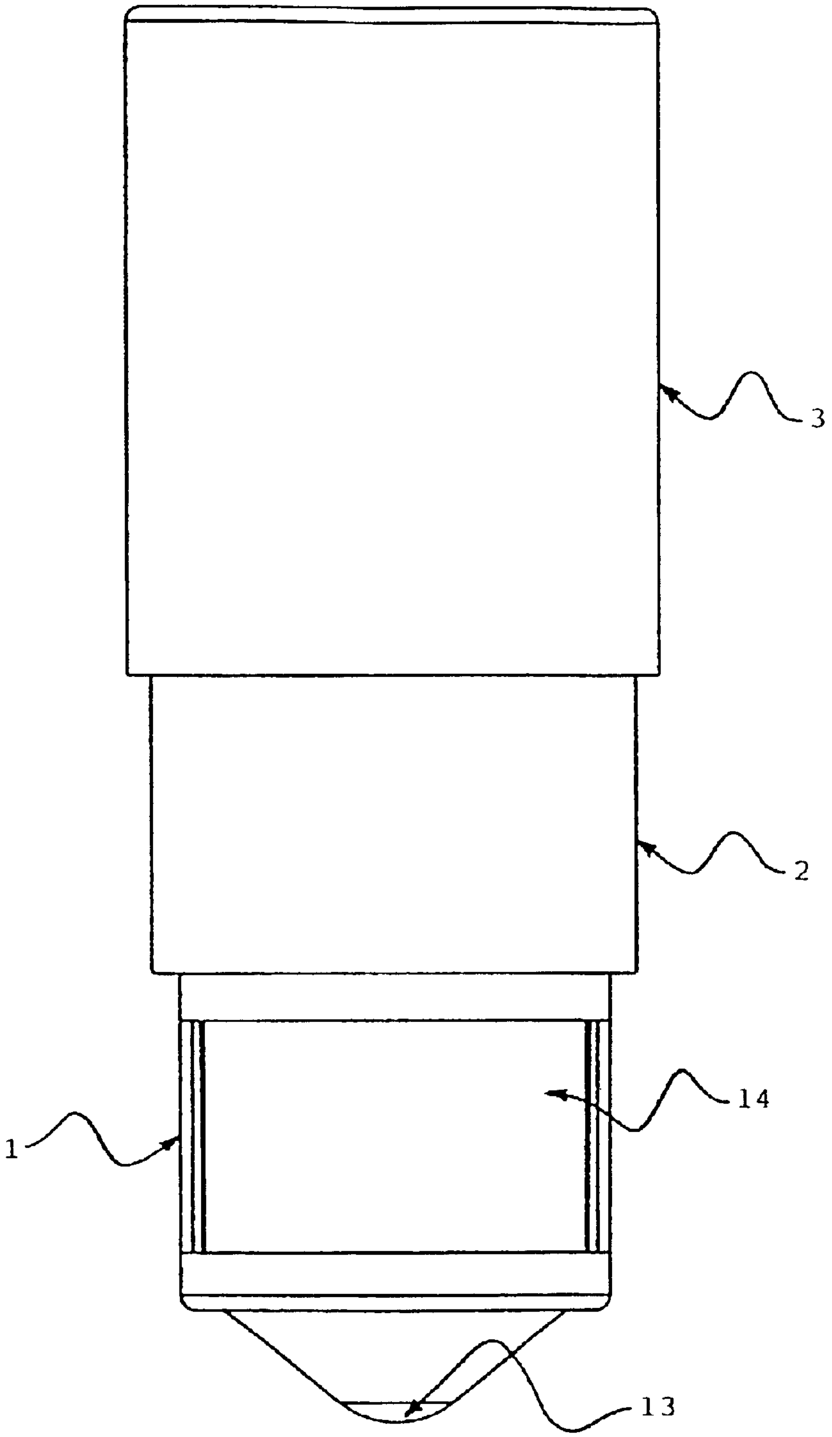
FIG. 4 shows a front view of the embodiment as shown in FIG. 1, with the second PIR motion detector lens fully visible.
Figure 5:
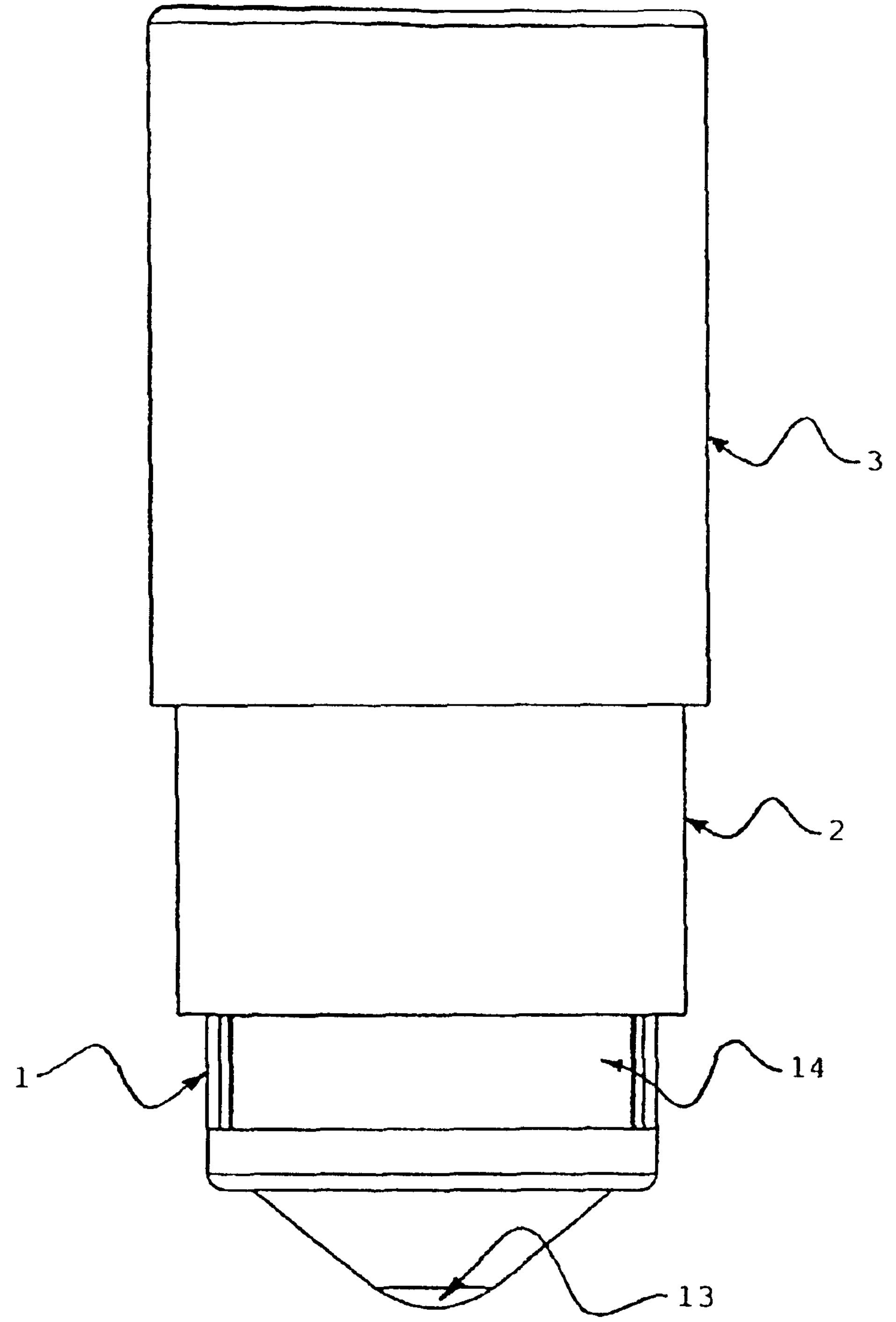
FIG. 5 shows a front view of the embodiment as shown in FIG. 1, with the second PIR motion detector lens partly visible.
Figure 7:
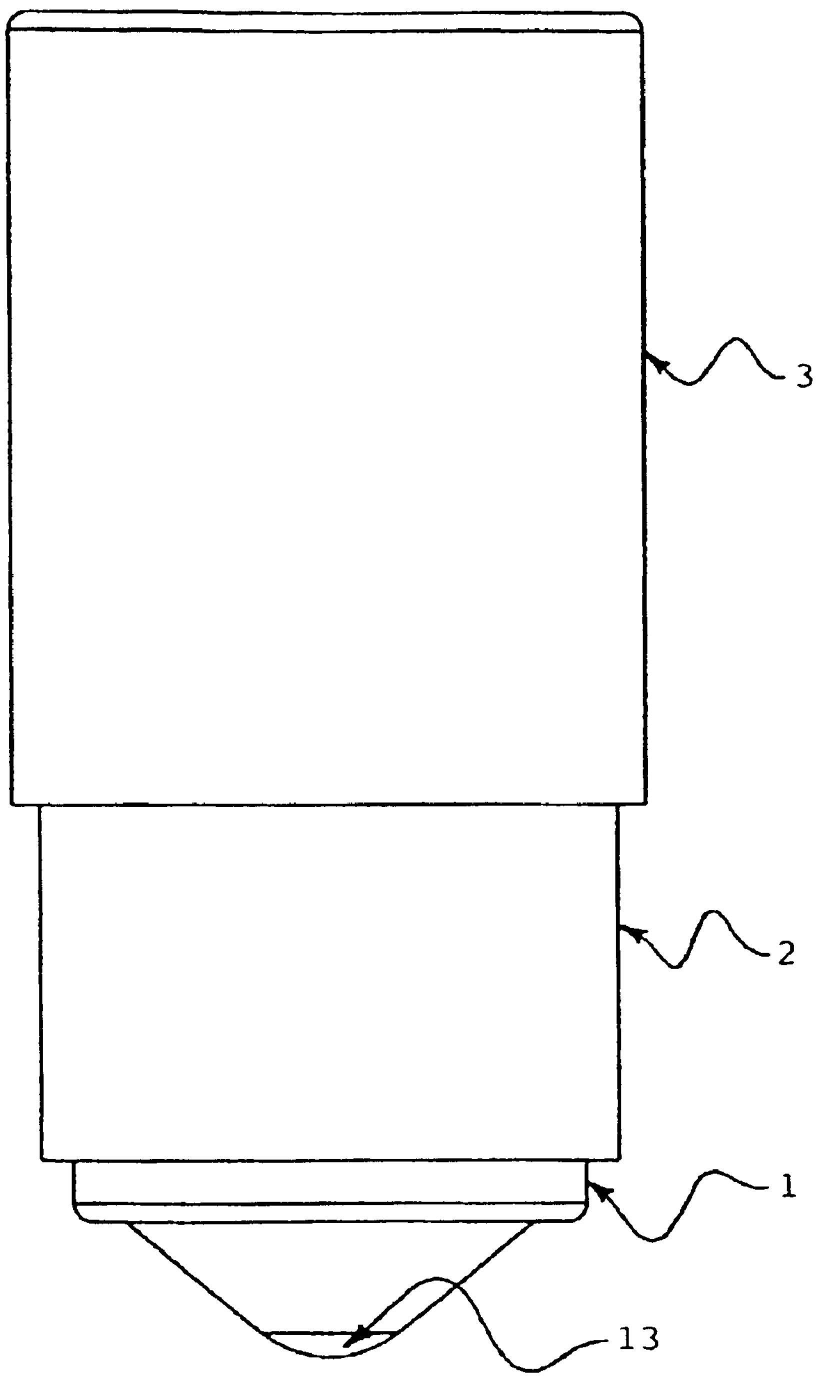
FIG. 7 shows a front view of the embodiment as shown in FIG. 1, with the electronic adjustment controls, the LEDs and the second PIR motion detector lens in a concealed position.

As shown in FIG. 3, the inner tube 1 is partially retracted. The LEDs 12, the full second PIR motion detector lens 14, and the downwardly viewing first motion detector lens (13) are visible. As shown in FIG. 4, the inner tube 1 is further retracted. The full second PIR motion detector lens 14 and the first motion detector lens 13 are visible. As shown in FIGS. 5 and 6, the inner tube 1 is further retracted. Only part of the second PIR motion detector lens 14 and the full first motion detector lens 13 are visible. As shown in FIG. 7, the inner tube 1 is completely retracted. The electronic adjustment controls 11, the LEDs 12 and the second PIR motion detector lens 14 are now concealed. Only the first motion detector lens 13 is visible.

The covering and mounting structure 10*a* can be mounted on a wall or on a ceiling using appropriate attachment mechanisms. A wall-mounted and a ceiling-mounted covering and mounting structure 10*a* are as shown in FIGS. 8 and 9, respectively.

The present invention is not restricted to the first embodiment illustrated and described above. Other embodiments, modifications and alterations can be made within the scope of the invention defined in the appended claims.

Figure 10B:
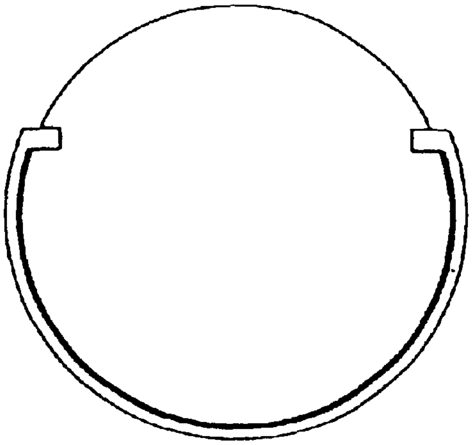
FIG. 10*b* shows a top view of the embodiment shown in FIG. 10*a*.
Figure 10A:
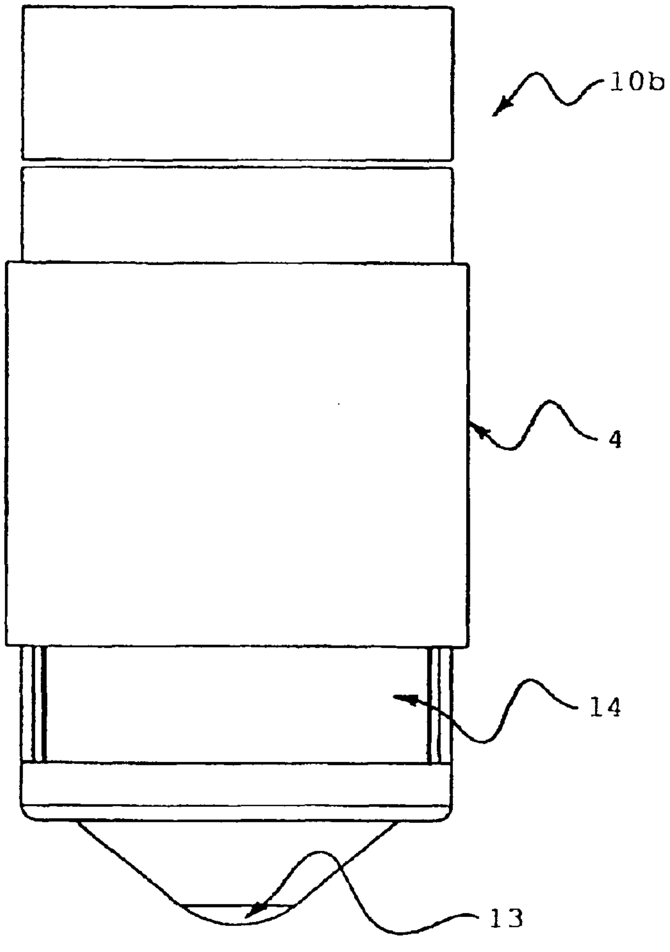
FIG. 10*a* shows a front view of a second preferred embodiment of the invention, depicting a single body cylindrical covering and mounting structure in pendant arrangement, with electronic adjustment controls, LEDs, and second PIR motion detector lens being selectively masked by an exterior covering structure.
Figure 11:
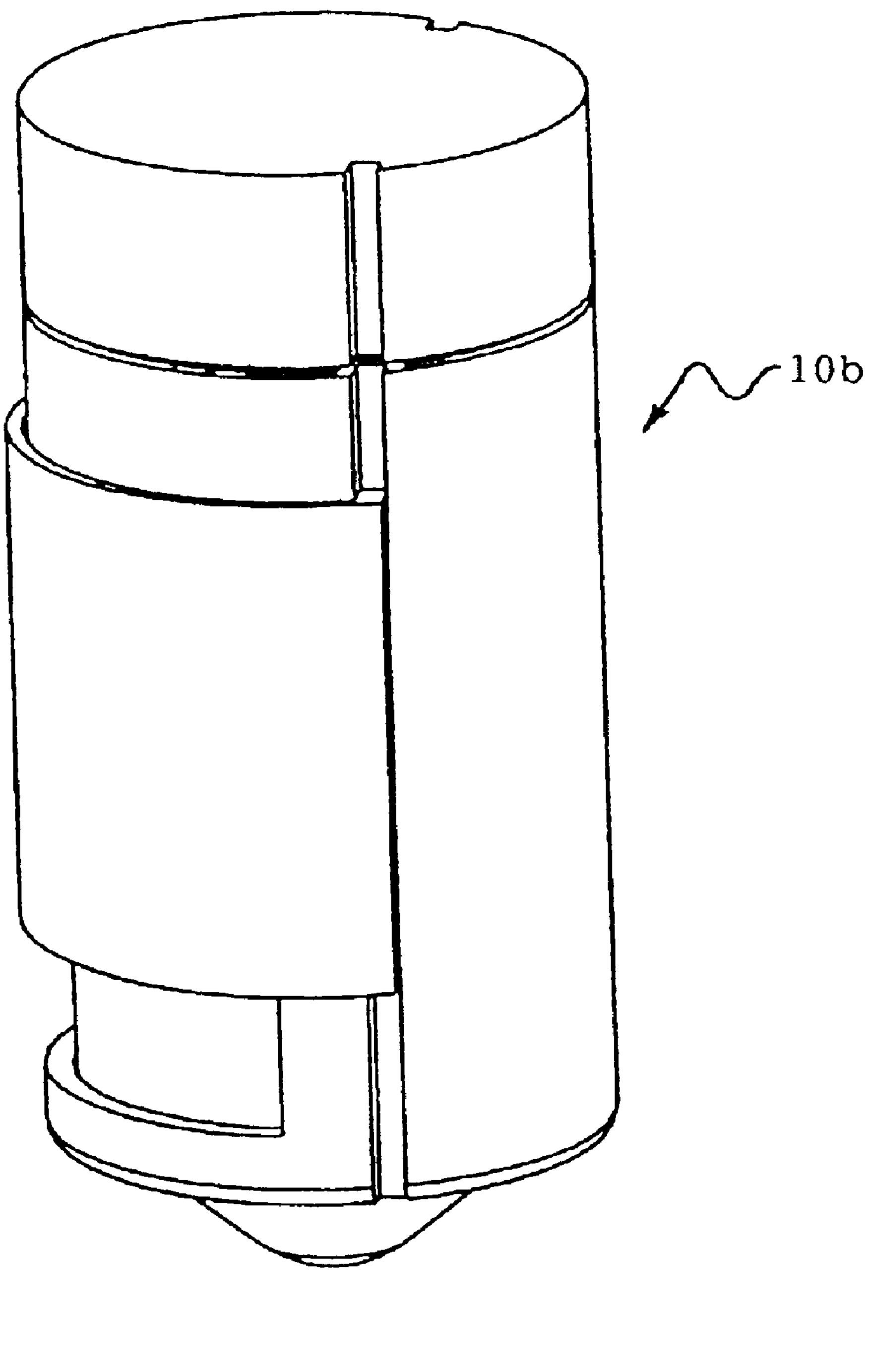
FIG. 11 shows a perspective view of the embodiment shown in FIG. 10*a*.

A second embodiment is a single body cylindrical covering and mounting structure 10*b*, as shown in FIGS. 10*a*, 10*b* and 11. Since the covering and mounting structure 10*b* is not telescopic, an exterior covering structure 4 is employed to selectively mask the product features carried thereon. It is important to note that the shape of the exterior covering structure 4 must match and fit the shape of the mounting structure. Again, the second preferred embodiment can be disposed in a pendant or standing post arrangement. In the case of pendant arrangement, it is advantageous to include a downwardly viewing first motion detector lens 13 and a laterally viewing second PIR motion detector lens 14 for motion detection, according to the teaching of the invention. In the case of standing post arrangement, only a laterally viewing second PIR motion detector lens 14 is employed.

Figure 12:
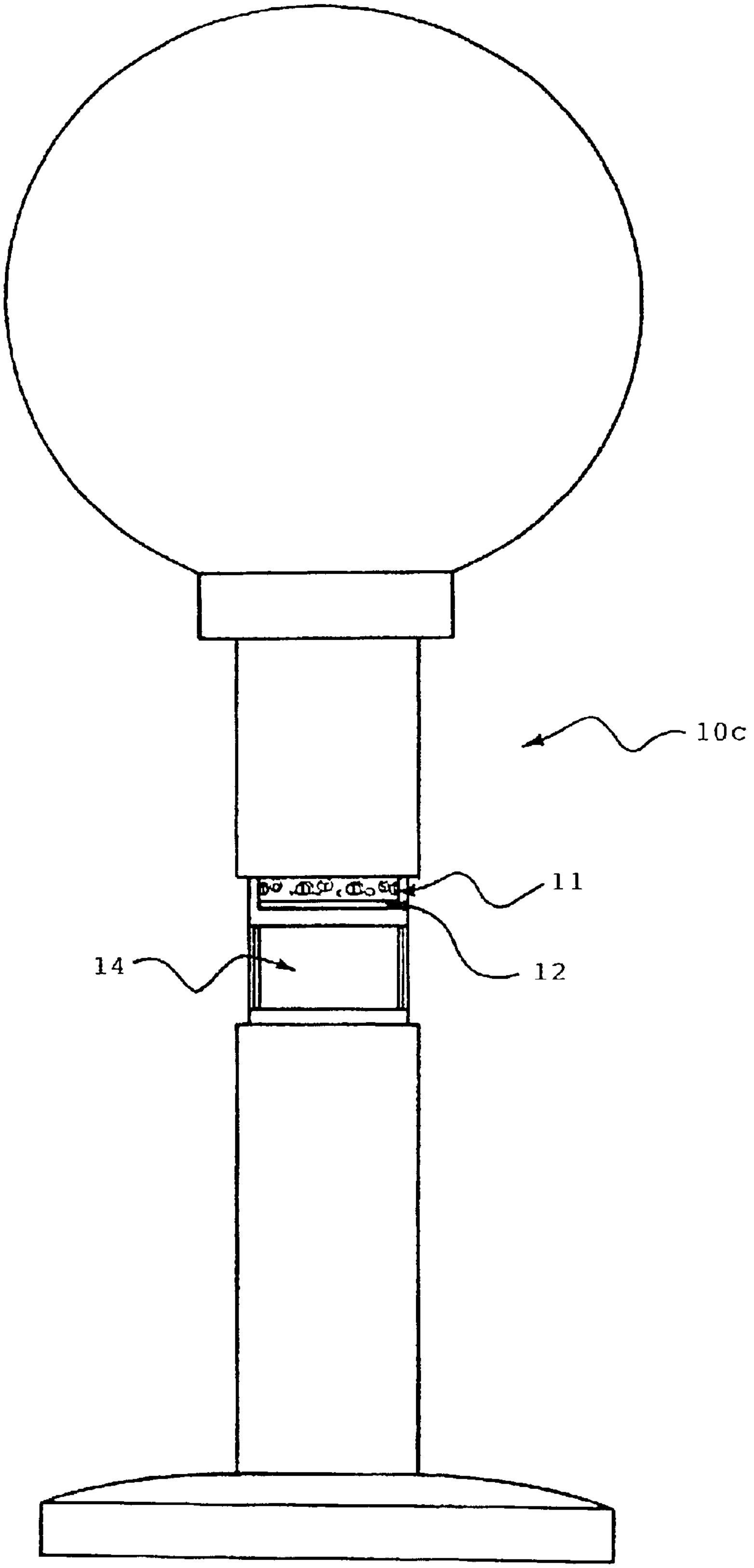
FIG. 12 shows a front view of a third preferred embodiment of the invention, depicting a telescopic cylindrical covering and mounting structure in standing post arrangement, with electronic adjustment controls, LEDs and second PIR motion detector lens in a fully extended position.

A third preferred embodiment of the invention depicts a telescopic cylindrical covering and mounting structure 10*c* disposed in a standing post arrangement, with electronic adjustment controls 11, LEDs 12 and second PIR motion detector lens 14, in a fully extended position, as shown in FIG. 12. It is important to note that only one laterally viewing second PIR motion detector lens 14 is provided on the covering and mounting structure.

In the three embodiments mentioned above, the covering and mounting structure 10*a*, 10*b*, 10*c* are all cylindrical in shape. The covering and mounting structure 10 can also be constructed in a non-cylindrical shape. In that situation, a non-circular channel is employed instead of cylindrical tube in the telescopic design.

What is claimed is:

1. A covering and mounting apparatus for a motion detector device, the motion detector device having electronic adjustment controls, light emitting diodes (LEDs), and at least one motion detector lens, the covering and mounting apparatus comprising: an inner channel, an intermediate channel, and an outer channel, wherein the inner, intermediate and outer channels are telescopically assembled.

2. The covering and mounting apparatus of claim 1 wherein the covering and mounting apparatus is disposed in a pendant relationship; wherein the inner channel houses a downwardly viewing first motion detector lens, and a laterally viewing second passive infra-red (PIR) motion detector lens above the first motion detector lens; and wherein the inner channel also houses the LEDs above the second passive infra-red motion detector and the electronic adjustment controls above the LEDs.

3. The covering and mounting apparatus of claim 2 wherein the inner channel, intermediate channel and outer channel can be retained at various relative positions such that the electronic adjustment controls, the LEDs, and the laterally viewing second PIR motion detector lens are selectively concealed by the intermediate or outer channels.

4. The covering and mounting apparatus of claim 1 further comprising a mounting device for attachment to a ceiling or wall, the mounting device being attached to the outer channel such that the channels hang vertically down, whether ceiling mounted or wall mounted.

5. The covering and mounting apparatus of claim 1 wherein th inner channel houses a laterally viewing second PIR motion detector lens, LEDs above the laterally viewing second PIR motion detector lens, and electronic adjustment controls above the LEDs, and wherein the covering and mounting apparatus is disposed in a standing post arrangement.

6. The covering and mounting apparatus of claim 1 wherein the inner channel, intermediate channel and outer channel are each cylindrical in shape.

7. The covering and mounting apparatus of claim 1 wherein the inner channel, intermediate channel and outer channel are each non-cylindrical in shape.

8. A covering and mounting apparatus for a motion detector device having electronic adjustment controls, LEDs, and at least one motion detector lens, comprising:

a body housing the motion detector device;

an exterior cover moveably attached to the body for selectively masking the electronic adjustment controls, the LEDs, and the motion detector lens; and a mounting device for attachment to a wall or ceiling, the mounting device being attached to the body such that the body is disposed in a pendant arrangement, and where the body houses a laterally viewing PIR motion detector lens.

* * * * *